Aug. 10, 1965  R. J. DORN  3,199,871
BALL AND METHOD OF MAKING SAME
Filed April 10, 1959  3 Sheets-Sheet 1

INVENTOR.
RANDOLPH J. DORN
BY
*Ely, Pearne & Gordon*
ATTORNEYS

Aug. 10, 1965  R. J. DORN  3,199,871
BALL AND METHOD OF MAKING SAME
Filed April 10, 1959  3 Sheets-Sheet 2

INVENTOR.
RANDOLPH J. DORN
BY
Ely, Pearne &
Gordon
ATTORNEYS

Aug. 10, 1965    R. J. DORN    3,199,871
BALL AND METHOD OF MAKING SAME
Filed April 10, 1959    3 Sheets-Sheet 3
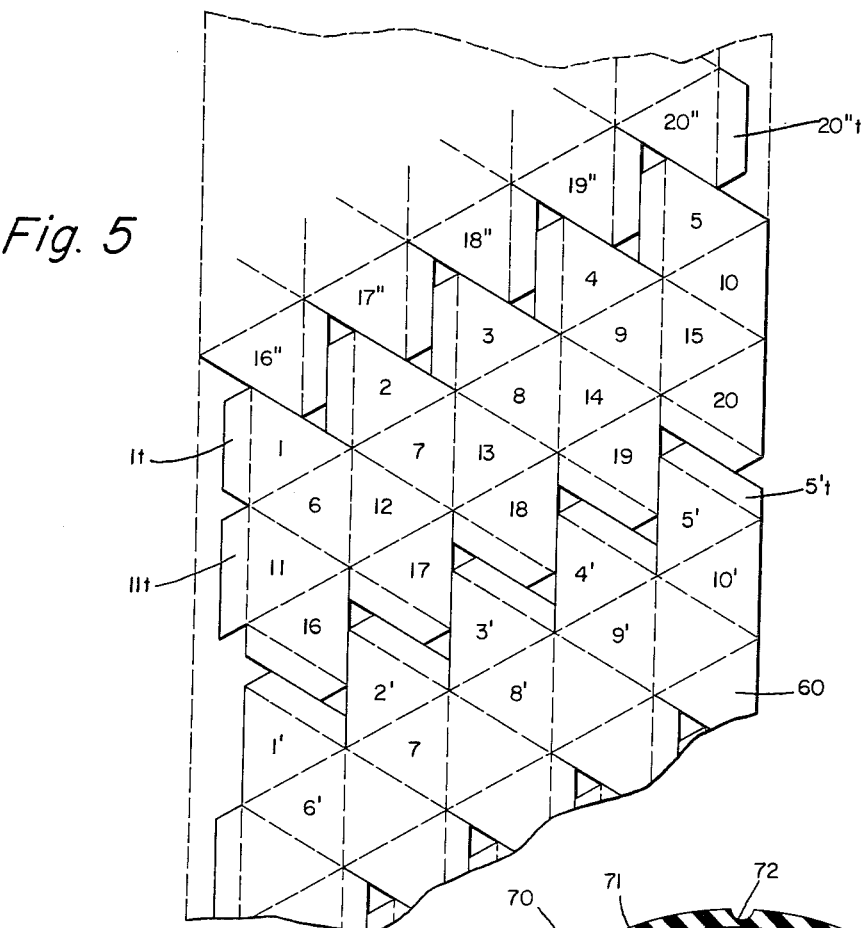
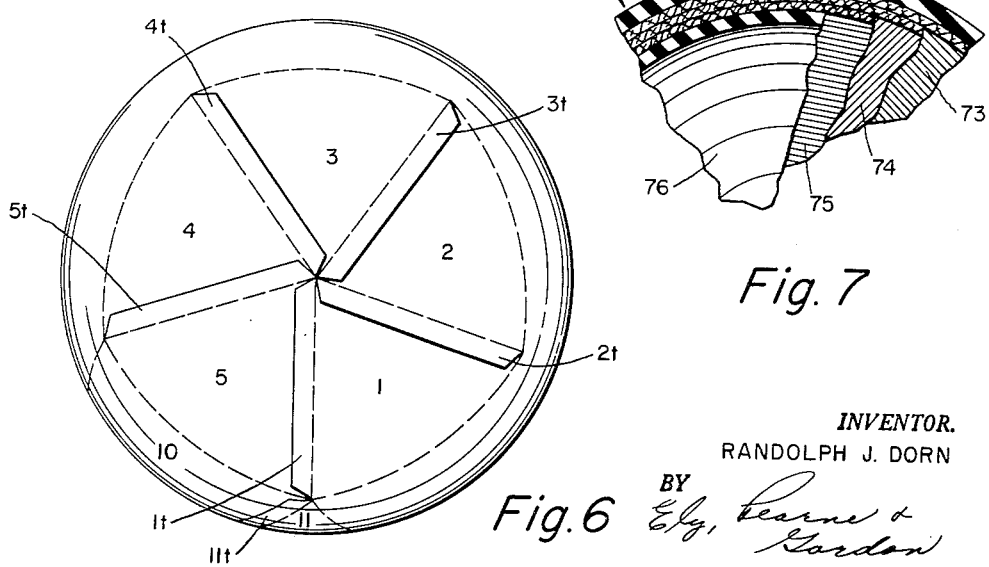
INVENTOR.
RANDOLPH J. DORN
BY Ely, Pearne & Gordon
ATTORNEYS United States Patent Office 3,199,871
Patented Aug. 10, 1965

3,199,871
BALL AND METHOD OF MAKING SAME
Randolph J. Dorn, Sandusky, Ohio, assignor to The Barr Rubber Products Company, Sandusky, Ohio, a corporation of Ohio
Filed Apr. 10, 1959, Ser. No. 805,529
12 Claims. (Cl. 273—65)

This invention relates to an improvement in the manufacture of hollow balls and hemispheres and, particularly, in the manufacture of the carcass and/or covers for basketballs and like sport balls, preferably fabric-reinforced.

The manufacture of hollow spherical balls for sports and toys from planar sheet material has always presented the problem to the art of forcing an essentially planar sheet material to assume the compound curvature of a spherical surface. This at best and necessary still is an approximation, since it is a mathematical impossibility to cause such a planar material to assume a true spherical curvature without distortion. The most conventional way of achieving such a spherical approximation with a planar or web material such as woven textile fabric, leather, sheet rubber, or the like, has been to cut the sheet material into segmented gores or "orange peels" having convex arcuate edges, the curvature of the edges approximating the curvature of a great circle of the desired sphere. Another familiar approach to the problem has been to cut the planar material into roughly figure-eight shaped pieces and join the edges together, as in the familiar pattern of a baseball cover.

The foregoing approaches and variations of them have had several serious faults, which have become increasingly serious as the cost of labor and material has increased. In the first place, the sheet material is never uniformly stretched or distorted when forced to assume a spherical shape, with the result that the balls always have a tendency to go out-of-round in use. Further, the fact that a greater number of gores generally more closely approached a sphere was self-defeating, in that the greater number of gores also increased the number of seams, which themselves tended to distort the ball and also increased the labor cost. Also, any curvature in the gores or segments necessarily meant that, regardless of how the gores were laid out for cutting from the sheet material, a substantial quantity of sheet material between the gores was wasted.

An object and advantage of this invention is to provide a ply or cover for a ball which may be cut in one piece from the sheet material and yet be formed into a completely spherical cover or ply with a minimum of distortion. And such distortion is relatively uniform, minimizing the tendency of the ball to go out-of-round. Another and great advantage is that plies or covers are cut along straight lines, minimizing waste; this is a very substantial advantage, even when using uncured rubber stock or like plastic stock, for even though cuttings from such stock may be salvaged and re-worked, such re-working is expensive and presents problems in compounding the cuttings and fresh stock. Still another advantage is that, the ply or cover stock preferably being of one piece, handling time and labor costs are reduced; only one seam need extend from pole to pole of the sphere and the remaining seams are relatively self-locating and easily formed.

Because of the difficulties in approximating a sphere or spherical surface with flexible or stretchable sheet materials, the art has tended in recent years to build up a reinforced basketball, for example, by inflating a relatively thin-walled bladder to approximately spherical form and then winding a tape or cord over the bladder, either in a random or regular pattern. This practice not only required winding machinery of varying degrees of complexity and means for preventing the cord or tape from slipping as it was wound on the bladder, but, fundamentally, the ultimate sphericity of such a wound ball after use was generally no better than the original sphericity of the bladder upon which the winding was made. Balls made according to this invention are conveniently built up on a bladder, but their ultimate sphericity is relatively independent of the sphericity of the bladder.

In the manufacture of rubber-covered basketballs, for example, it is usual practice to draw or form the sheeted cover stock of uncured rubber into hemispheres, which are then placed on the ball carcess. Unless such hemispheres are molded under pressure between dies which are accurately concentric when closed, the gauge of such hemisphere is consistently non-uniform. Employing the present invention, such hemispheres of cover stock may be formed, which, though not absolutely uniform in wall thickness, may be much more nearly so.

Other objects and advantages of this invention will be apparent from the following specification, claims, and drawings in which:

FIG. 5 is a plan view showing the manner of cutting a suitable development similar to FIG. 2, but providing integral seaming tabs.

FIG. 6 is a polar view of a ball carcess formed from a fabric cut according to a development as shown in FIG. 5.

FIG. 7 is a fragmentary cross-sectional detail of a ball made according to this invention.

Essentially this invention stems from an application of the ancient but seldom utilized geometric theorem that an icosahedron (twenty sides) is the regular polyhedron having the maximum number of sides, a regular polyhedron being defined as a polyhedron whose faces are identical equi-angular equilateral polygons. It can also be demonstrated as a corollary, that apices (the points where more than two faces are tangent) of a regular polyhedron are equi-distant from a center; i.e., the apices of a regular polyhedron will lie in a sphere. Applying the principles of maxima and minima, therefore, an icosahedron is the regular polygon most closely approximating a sphere. Also, considering the radius of a polyhedron as the distance from the center to an apex, an icosahedron is the polyhedron (a) in which the polyhedral surface, when expanded to a sphere having a radius equal to the radius of the polyhedron, will undergo least distortion of the integers of area most distorted; and (b) in which there are the greatest number of integers of area of maximum distortion. Since it is also true that the centers of the face of any regular polyhedron are located at equal spherical angles with respect to each other and, in expanding a regular polyhedron into a sphere of equal radius, an integer of maximum distortion is at the center of a face, it therefore follows that expanding an icosahedron to a sphere, the icosahedron affords not only the minimum proportional distortion in the areas of maximum distortion, but the stresses of such distortion are most thoroughly and uniformly distributed over the entire surface.

Figure 1:
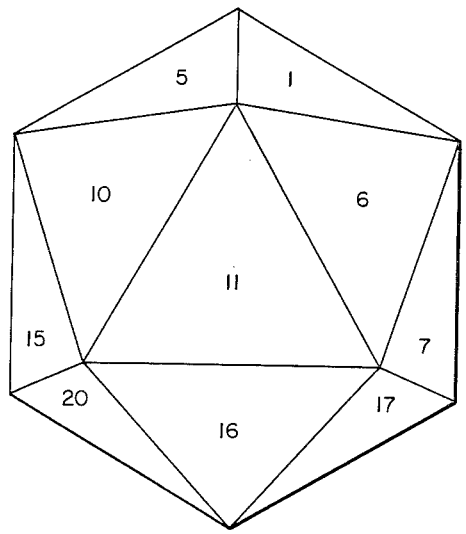
FIGURE 1 is an elevation of an icosahedron.
Figure 2:
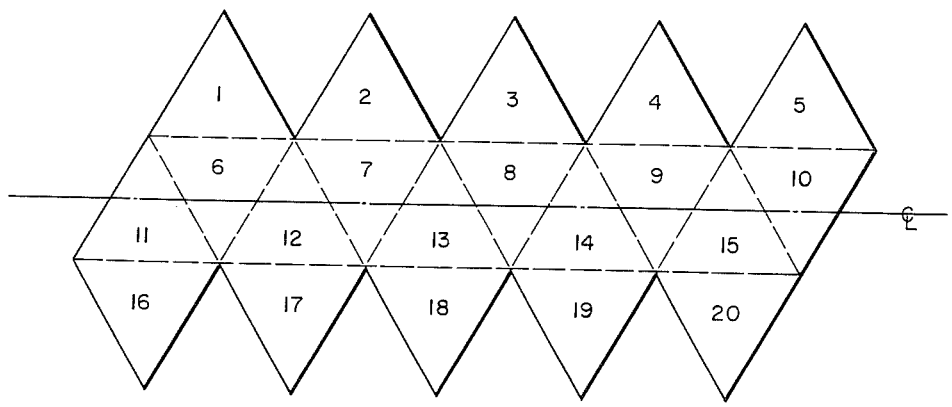
FIG. 2 is a development of the icosahedron shown in FIG. 1.

Another fortuitous circumstance is that the faces of an icosahedron are isosceles triangles or more particularly equilateral triangles and, therefore, may be arranged in a plane, i.e., developed. And it is possible to develop the surface of an icosahedron so as to form a polygon having two parallel edges connected by two opposite sides made up of equal salient and re-entrant angles, that is, uniformly zig-zagging. Thus, FIG. 1 shows an icosahedron. It will be noted that, as numbered, the icosahedron is made up of five tangent polar triangles, numbered from 1 to 5, ten circumferential triangles, numbered from 6 to 15, and five antipodal triangles, numbered from 16 to 20. For purposes of references and orientation, the twenty triangles of the icosahedron will be so numbered in all following figures of the drawing. FIGURE 2 shows how the twenty triangles may be developed into a polygon having parallel sides and opposite equally zig-zagged edges. It is also evident from FIG. 2 that the development of the icosahedron of FIG. 1 may be bisected by the centerline CL.

Figure 3:
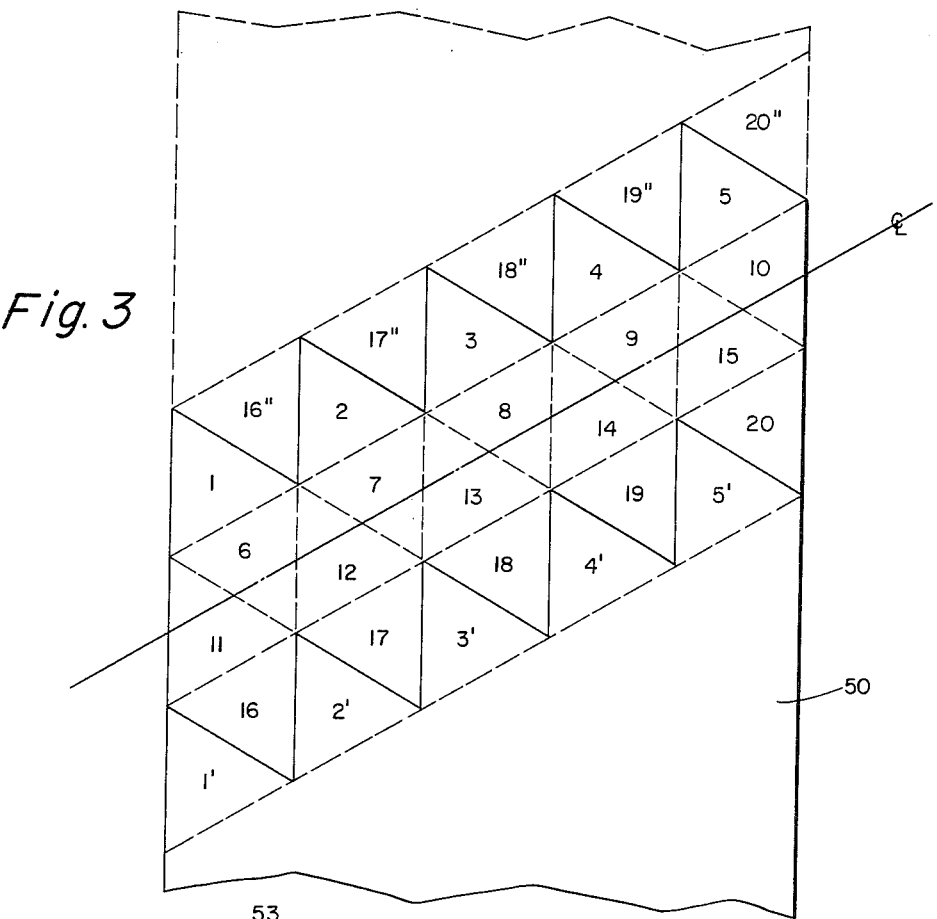
FIG. 3 is a plan view showing how the development of FIG. 2 may be cut from a sheet without waste.

Applying the development of FIG. 2, FIG. 3 shows how a development of FIG. 2 may be cut from a web or sheet of planar material 50 without waste by locating the centerline CL so that it intersects the parallel edges of the sheet 50 at supplementary angles of 60° and 120°. As indicated in FIG. 3, if the development of the triangles 1 to 20 is cut from the sheet 50, as shown by the solid lines, the apices of the polar triangles 1 to 5 will have been formed by the antipodal triangles 16″ to 20″ of the preceding development cut from the sheet and the apices of triangles 16 to 20 will form the apices of triangle 1′ to 5′ of the succeeding sheet.

Figure 4:
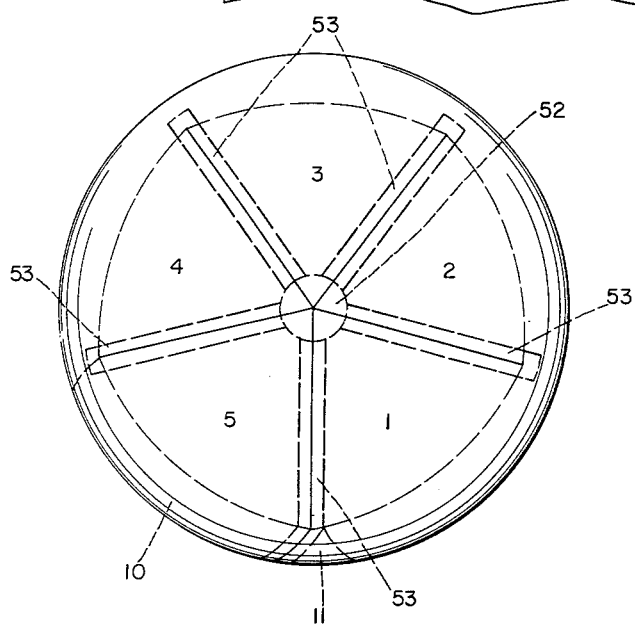
FIG. 4 is a polar view of a hemisphere formed from the upper half of the development shown in FIG. 2.

Applying the principles of the foregoing to the shaping of a hemispherical ball cover of, for example, calendered uncured rubber stock, a development of triangles 1 to 20 is cut from a sheet 50 of such stock, as shown in FIG. 3. The development is then bisected along the centerline CL. Depending upon the elasticity of the sheet material 50 and whether it is desired to distort the development by stretching at the centers of the triangular faces, or compressing at the apices, or by a combination of such distortions, the width of the sheet 50 will usually vary from approximately 75% to 87% of the circumference of the sphere or hemisphere to be covered. The bisected development is then laid on a spherical or hemispherical form, which may be the carcass of the ball to be covered, the edge of triangle 10 is then butt-seamed against the edge of the triangle 11, and the edge of triangle 5 is butt-seamed to the edge of the triangle 1, providing a seam extending from the pole to the equator of the hemisphere. Triangles 2, 3, and 4 are then pulled against the form and the remaining adjacent edges of triangles 1 to 5 are drawn together and butt-seamed, as shown in FIG. 4, to form the hemispherical ball cover 51. Instead of forming the hemispherical cover over a convex form, it is to be understood that the hemispherical development may be laid in a concave cavity and the edges may be seamed as described above. It is also to be understood that a spherical ply of fabric, cut into the form of a full icosahedral development as shown in FIG. 3, may be formed over a spherical core, say the bladder of a basketball in the same fashion. If desired, the butt seams may be reinforced, as with a pole patch 52 and/or tapes 53 as shown in dotted line in FIG. 4.

In various ball construction, butt or butt and taped seams may not be desirable, especially in laying up plies of reinforcing fabric, and lap seams may be desired; if so, then the plies may be die cut from a sheet of fabric 60, for example, as shown by the solid lines in FIG. 5. As indicated, the width of the sheet 60 is slightly greater than the sheet would be if simple butt-seaming developments were to be cut, as in FIG. 3. As indicated, the development of triangles 1 to 20 is oriented in the same manner as in FIGS. 2 and 3, but the successive developments cut from the sheet are spaced or staggered to provide space between preceding and succeeding developments, such spacing being utilized to provide seaming tabs, of which only seaming tabs 1t, 11t, 5′t, and 20″t are identified by reference numerals in FIG. 5 for purposes of clarity.

When the sheet material 60 is cut, it is then laid on a suitable spherical form (usually the bladder or carcass of a basketball or the like) and the seam between triangles 10 and 11 is formed by drawing the belt formed by the circumferential triangles 6 to 15 around the form and lapping the seaming tab 11t over the triangle 10; each of the polar triangles 1 to 5 are then joined by overlapping their respective seaming tabs over the adjacent triangles, as shown in FIG. 6. The antipodal triangles 16 to 20, of course, are similarly joined.

If a second ply is to be laid over the first ply after the first ply is laid as shown in FIG. 6, it is preferable that the poles of the second ply, located by its triangles 1 to 5 and 16 to 20, be equally spaced from the poles of the first ply. Further, since a woven textile fabric within any triangle is on a bias, it is also preferable that the longitude of the pole of one ply with respect to the equator of an adjacent ply be located so as to provide, on the average, maximum angularity between the run of the goods in one ply with respect to the run of the goods in the adjacent ply. If additional plies are employed, the poles of the several plies are preferably spaced equally from each other, and the angularity of the run of the goods of the several plies should be at the optimum. Since the icosahedral pattern of the plies can locate twelve poles or apices, up to six plies may be employed without duplicating polarity or run of the goods.

In this connection, it is to be noted that each seam meeting at a pole in any one ply lies in a different great circle of the ball than the great circles of the other seams meeting at that pole and that the length of any seam (becoming in effect the altitude of the spherical triangles formed by the polar triangles) is not substantially greater than one-sixth the circumference of the ball. The great strength of a ball made according to this invention may be due to the relatively short great circle length of any given seam. Further, where a multi-ply construction is employed and the poles of the adjacent plies are displaced with respect to each other, the great circles of the seams of one ply necessarily intersect the great circles of the seams of an adjacent ply, thereby effecting an overlapping of relatively short seams.

In building a fabric reinforced ball according to this invention, the ply or plies of rubber or plastic impregnated fabric are generally laid up on a bladder inflated to slightly less than its diameter when inflated during cure. After the plies are laid up and the cover is placed on the carcass, it is preferable that the ball be fully inflated in a forming die; under such inflation, the elements in the wall of the ball formed from an icosahedral development are fully expanded into a spherical curvature, which curvature is then fixed by vulcanization during the cure. FIG. 7 of the drawings illustrates the wall construction of a fabric-reinforced ball made in this fashion. As shown in FIG. 7, the ball 70 comprises an outer cover 71 of vulcanized rubber stock into which the conventional cover seam lines 72 and similar surface decoration is molded during cure. In this particular instance, the ball is built up of three plies of fabric 73, 74, and 75 vulcanized to each other and the bladder 76 upon which the plies were laid up in the building operation. In FIG. 7 the bladder and first and second plies are partly broken away to indicate by the hatching line the preferable diverse directions of the runs of the several plies. In a three ply construction, the polar axes are preferably perpendicular to each. By so displacing the poles of plies built up from an icosahedral development, as described above, not only are the integers of maximum distortion in a given ply, i.e., the weak spots of that ply, overlaid by stronger integers of the other plies, but there is very little internal bulging of the bladder due to multiplications of thicknesses of crossing seams. This internal bulging due

What is claimed is:

1. The method of making a ball from distortable sheet material comprising the steps of cutting the sheet material to be shaped to a spherical curvature in the form of a development of an icosahedron, laying said development on a spherically curved surface, and joining the edges of said development as they would be oriented in an icosahedron while distorting the sheet material of said development to assume the curvature of said spherical surface.

2. The method as defined in claim 1 in which said development of an icosahedron comprises a belt section having parallel opposite longitudinal sides substantially five times the length of its lateral sides and two sets of polar sections, each set of polar sections comprising five adjacent equilateral triangles having bases common with and extending the length of a longitudinal side of said belt section.

3. The method as defined in claim 2 in which said development includes a tab integral with one lateral side of said belt section for overlapping the opposite lateral side of said belt section when the edges of said development are joined.

4. The method as defined in claim 2 in which said polar sections include tabs for overlapping the edges of adjacent polar sections when the edges of said development are joined.

5. The method of forming a hemispherical section from distortable sheet material comprising the steps of cutting a development from said sheet material, said development comprising a belt section comprising a parallelogram having opposite longitudinal sides substantially ten times the length of its lateral sides and a set of polar sections comprised of five adjacent equilateral triangles having their bases common with and extending the length of a longitudinal side of said belt sections, laying said development on a hemispherical surface and joining the lateral edges of said belt section and adjacent sides of said triangles while distorting said sheet material toward the curvature of said hemispherical surface.

6. The method as defined in claim 5 in which tabs are provided on the edges of said development for forming overlapping seams when said edges are joined.

7. The method of cutting a length of distortable sheet material to provide developments for shaping to a spherical curvature comprising the steps of cutting a belt section extending transversely of the width of said sheet material and integral polar sections comprised of a plurality of adjacent triangles of equal altitude and having bases common with and extending across one side of said belt section, and cutting successive similar developments from said length of strip material, the cuts across the width of said strip to define the triangular polar sections of one development defining the triangular polar sections of a succeeding development.

8. The method as defined in claim 7 in which at least one of said polar sections is provided on one side with an integral tab for forming an overlapping seam when the edges of said polar sections are distorted and joined in forming the polar area of a spherical surface.

9. A ply for a ball comprising a development of distortable sheet material, said development comprising a belt section having a longitudinal length substantially equal to the circumference of the ball to be formed therewith and five substantially isosceles triangular polar sections adjacent to each other and having their bases common with and extending the length of said belt section, said triangular polar sections each having equal altitudes, said altitudes being substantially equal to one-sixth of the length of said belt section.

10. A ply for a ball as defined in claim 9 in which said distortable sheet material is a textile and said belt section extends at a bias to said textile.

11. A ball comprising a bladder and a flexible ply covering said bladder, said ply being formed of distortable sheet material cut in the form of a belt section having a length substantially equal to the circumference of said ball and joined at opposite ends and polar sections of said ply comprising a plurality of adjacent substantially isosceles triangular portions having substantially equal bases integral with said belt section, said polar sections having substantially equal altitudes extending from said belt portion to a pole of said ball, said altitudes being substantially equal to one-sixth of the circumference of said ball, and adjacent edges of said triangular polar sections being seamed together from said pole to said belt portion.

12. A ball as defined in claim 11 including a second ply over said first ply, said second ply being formed from a development of distortable sheet material and seamed at its edges similar to said first ply, but said second ply being oriented and arranged with respect to said first ply so that each of the seams meeting at one pole in one ply lies on a great circle of said ball which intersects each great circle located by each other seam at said pole and said great circles located by the seams at one pole of said one ply intersect the great circles located by the seams at one pole of an adjacent ply.

References Cited by the Examiner

UNITED STATES PATENTS

| | | | |
|---|---|---|---|
| 639,513 | 12/99 | Bristol | 83—48 |
| 712,412 | 10/02 | Richards | 273—58 |
| 1,109,183 | 9/14 | Schneider | 273—58 |
| 1,335,627 | 3/20 | Waterfield | 28—78 |
| 1,499,314 | 6/24 | Cobb | 28—78 |
| 1,853,515 | 4/32 | Egerer | 273—58.4 |
| 2,510,213 | 6/50 | Ekstedt et al. | 154—16 XR |
| 2,510,215 | 6/50 | Pityo et al. | 154—16 XR |
| 2,684,106 | 7/54 | Fegan | 154—16 |
| 2,741,308 | 4/56 | Meyer | 164—17 |
| 2,819,753 | 1/58 | Nogue | 154—16 |
| 2,850,090 | 9/58 | Biel et al. | 164—17 |
| 2,877,570 | 3/59 | Starworth | 154—16 XR |

FOREIGN PATENTS

| | | |
|---|---|---|
| 716,165 | 1/42 | Germany. |
| 6,407 | 1914 | Great Britain. |
| 20,171 | 1894 | Great Britain. |
| 21,669 | 1896 | Great Britain. |
| 203,468 | 9/32 | Great Britain. |

EARL M. BERGERT, *Primary Examiner.*

CARL F. KRAFFT, DELBERT B. LOWE, *Examiners.*